United States Patent [19]

Su

[11] 3,963,801

[45] June 15, 1976

[54] BLENDS OF COPOLYESTERS, ETHYLENE/CARBOXYLIC ACID COPOLYMERS AND A POLYCARBODIIMIDE

[75] Inventor: Aaron Chung Liong Su, Wilmington, Del.

[73] Assignee: E. I. Du Pont de Nemours and Company, Wilmington, Del.

[22] Filed: May 23, 1975

[21] Appl. No.: 580,511

[52] U.S. Cl............................ 260/873; 260/45.9 R; 264/95
[51] Int. Cl.² ......................................... C08L 67/06
[58] Field of Search............................ 260/873, 75 N

[56] References Cited

UNITED STATES PATENTS

| 3,435,093 | 3/1969 | Cope................................. 260/873 |
| 3,835,098 | 9/1974 | Brown et al. ..................... 260/75 N |

*Primary Examiner*—Murray Tillman
*Assistant Examiner*—J. Ziegler

[57] ABSTRACT

Copolyesters blended with ethylene/carboxylic acid copolymers and a polycarbodiimide have increased melt strength, and are more readily processable by blow molding and extrusion film blowing techniques. The blends contain up to 20% by weight of the ethylene/acid copolymer. The acid groups may be partially neutralized to a level of about 10%.

12 Claims, No Drawings

BLENDS OF COPOLYESTERS, ETHYLENE/CARBOXYLIC ACID COPOLYMERS AND A POLYCARBODIIMIDE

This invention relates to blends of copolyester elastomers, ethylene/carboxylic acid copolymers and polycarbodiimides that have a melt strength sufficiently great that the blend can be more readily processed by blow molding and film blowing than the copolyester without the ethylene/carboxylic acid copolymer.

The copolyester elastomers used in the blends of this invention are well known and are described, among other places, in U.S. Pat. Nos. 3,763,109, 3,766,146 and 3,651,014 to W. K. Witsiepe. These patents point out that the copolyesters can be used to form articles by blow molding and extruded to form film (blown and unblown).

In particular, the copolyesters used in this invention consist essentially of recurring intralinear long chain ester units and short chain ester units randomly joined head-to-tail through ester linkages, the long chain ester units being represented by the formula

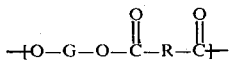

and the short chain ester units being represented by the formula

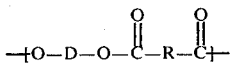

where G is a divalent radical remaining after the removal of terminal hydroxyl groups from at least one long chain glycol having a molecular weight of about 400–6000; R is a divalent radical remaining after removal of carboxyl groups from at least one dicarboxylic acid having a molecular weight less than about 300; and D is a divalent radical remaining after removal of hydroxyl group from at least one low molecular weight diol having a molecular weight of less than 250. The short chain ester units are present in the copolyester to the extent of between about 15 to 95% by weight of the copolyester, and often between about 25 and 85% by weight.

The copolyesters are produced by the techniques described in the Witsiepe patents. Preferably the copolyester has an inherent viscosity at a concentration of 0.1 gm./dl. in meta cresol at 30°C. of between about 0.75 and 1.7.

It has now been found that the addition of between about 0.2% and 20% by weight of a copolymer containing polymerized ethylene units and polymerized carboxylic acid units and 0.2 to 30% by weight of a polycarbodiimide to the copolyesters of the Witsiepe patents make compositions that are easier to process by blow molding techniques and by extrusion film blowing techniques.

The copolymer containing polymerized ethylene units and polymerized carboxylic acid units should contain between about 25 and 98.5% by weight ethylene units, and about 1.5 to about 30% by weight carboxylic acid containing units, and usually about 2 to 16% by weight carboxylic acid containing units. Other polymerized units can be present in major or minor amounts. Copolymers of this type are known in the art and are described, among other places, in U.S. Pat. No. 2,599,123 to Pinkney, U.S. Pat. No. 3,264,272 to Rees, and Belgian Pat. No. 818,609 to Greene. It is generally preferred that the carboxylic acid containing units be randomly distributed along the copolymer molecules. The Rees patent and the Greene patent teach how to obtain random copolymers. It is also possible to employ as the ethylene/carboxylic acid copolymer, polymers obtained by copolymerizing ethylene and other alkylenes, such as propylene and/or a diene such as hexadiene, and then grafting a carboxylic acid monomer to the polymeric substrate. Such grafting processes are described in published German patent application Nos. 2,401,149 and 2,448,598. When polymers of this latter type are to be employed it is generally desirable that the other alkylenes of the copolymer be present in an amount such that the copolymer prior to grafting is elastomeric. Elastomeric copolymers of this type are well known and are taught, for example, in U.S. Pat. No. 2,933,480 to Gresham and Hunt. Particularly desirable ethylene/carboxylic acid copolymers are the copolymers of ethylene and acrylic acid, methacrylic acid, maleic acid, fumaric acid, ethyl hydrogen maleate, or methyl hydrogen maleate. The above polymers can be made more elastomeric by the inclusion of such polymeric units as methyl acrylate, ethyl acrylate and the like in amounts up to about 60% by weight of the total polymer composition. Such copolymers containing between about 50 and 60 weight percent methyl acrylate form desirable blends with the copolyester. The other polymerized units listed in the Rees patent can also be included as desired. The ethylene containing copolymers useful in this invention are high molecular weight and have a Melt Index (unneutralized) in the range of about 0 to 400 gm./10 min. when measured under the A.S.T.M. test D.1238-52T at 190°C.

A portion, up to about 10% of the acid groups on the ethylene copolymer may be neutralized with metallic ions. The preferred ions for neutralizing the acid groups are alkali metal ions, alkaline earth ions, and zinc ions, but the other ions shown in the Rees patent may also be employed.

The addition of substantially linear polycarbodiimide to copolyesters is known and taught, among other places, in U.S. Pat. No. 3,835,098 to Brown et al. The substantially linear polycarbodiimides contemplated for use in this invention are disclosed in the Brown et al. U.S. Pat. No., i.e., polycarbodiimides having the formula $X_1-R_1\{N=C=N-R_2\}_n \quad N=C=N-R_3-X_2$ where $R_1$, $R_2$ and $R_3$ are $C_1-C_{12}$ aliphatic, $C_6-C_{15}$ cycloaliphatic, or $C_6-C_{15}$ aromatic divalent hydrocarbon radicals and combinations thereof, $X_1$ and $X_2$ are $$H, \quad \begin{matrix} -N-C-N-R_4, \\ | \; \| \; | \\ H \; O \; R_5 \end{matrix} \quad \begin{matrix} H \; O \\ | \; \| \\ -N-C-OR_6 \end{matrix}$$

where $R_4$, $R_5$ and $R_6$ are $C_1-C_{12}$ aliphatic, $C_5-C_{15}$ cycloaliphatic and $C_6-C_{15}$ aromatic monovalent hydrocarbon radicals and combinations thereof and additionally $R_4$ and $R_5$ can be hydrogen, and $n$ is at least 2 and not more than 30 and preferably between 3 and 10.

The amount of polycarbodiimide needed in the blend to achieve a satisfactory increase in melt strength will vary with the particular ethylene/acid copolymer employed, and the amount of neutralization of the acid groups, and with the particular polycarbodiimide added, but in general the polycarbodiimide will be present in an amount of about 0.2 to 30 percent by weight of the copolyester, preferably about 2 to 8% by weight. The polycarbodiimide also serves as a hydrolytic stabilizer for the blend.

The production of hollow objects from thermoplastics by blow molding is a known commercial method of manufacturing. See for example U.S. Pat. No. 3,745,150 to Corsover. The production of film from thermoplastics by extrusion and blowing is also a known commercial method of manufacturing. Both of these techniques have been previously disclosed as useful techniques for the processing of copolyesters; however, on a commercial scale such techniques have not been widely employed on these copolyesters because, it is believed, the copolyesters in the molten state have very little melt strength and when attempts are made to process the copolyesters by blow molding the extrudate (also called a parison), instead of hanging from the nozzle, often drops off. When attempts are made to blow film, the resin tends to fold back onto the surface of the extrusion die.

The blends of the present invention provide compositions having the desirable properties of the copolyesters when formed into molded objects or film and improved processing characteristics, that is, the blends have increased melt strength. One method of measuring melt strength is to find the force necessary to draw the extrudate of a predried polymer at a constant rate of 10 ft./min. from an Instron capillary rheometer operated at a temperature 30°C. above the melting point of the copolyester and using a die having an orifice diameter of 0.04 inch, length-to-diameter ratio of 4, and 90° entrance angle, with Instron cross head speed of 0.2 in./min. (The polymer is predried for 1 hour at 100°C. in a vacuum oven before testing.) This force is referred to herein as melt tension. In order for a copolyester compound to be blow moldable and extrudable into blown film at commercially desirable rates the copolyester compound should have a melt strength such that the product will have a melt tension of at least 0.4 gm.

In the following examples all parts and percentages are by weight and all melt tension measurements are at 230°C. unless otherwise specified.

GENERAL PROCEDURE FOR THE PREPARATION OF BLOWN FILM

The copolyester thermoplastic elastomer, the ethylene/acid copolymer and other additives such as stabilizer and carbon black are thoroughly mixed in conventional equipment such as:
1. electrically heated rubber mill at 205°–210°C. for 7 min.
2. single screw extruder with a mixing die or mixing torpedo at 210°C. for 30–40 sec.
3. twin screw continuous mixer-extruder at 230°–275°C. for 5–10 sec. in the mixer before extrusion.

The blends are granulated or pelletized and dried at 70°–100°C. for 1–3 hours.

Film is blown on a film blowing machine by the following procedure. The dried blend pellets are fed into an extruder where they are melted and forced, under pressure, through an adaptor and into a tubing die. The melt flows around the mandrel of the die into a channel leading to the die lips. The melt leaving the die is in the form of a circular sleeve which is blown up by internal nitrogen or air to the desired final tube size and correspondingly thinner gauge. The tube travels vertically at full diameter until it reaches a pair of pinch rollers. The flattened tube is led away from the pinch rollers and wound on a roll. Sheets of film can be obtained by slitting the tube lengthwise.

Two important characteristics of the extruded film, the thickness and the width, are controlled by the through-put of the extruder, the blow up ratio (ratio of diameter of the tube to that of the die) and the up take rate of the pinch rollers.

The equipment used for the following examples is a Killion 1 inch extruder and a conventional blow film device as just described. The molten copolyester flows through a ¾ inch diameter ring die with a gap of ~50 mil. Usually the temperature inside the extruder is set at 5°–10°C. above the melting point of the particular copolyester thermoplastic elasomer being used. The temperature of the die is set at about the same temperature as the melting point of the thermoplastic elastomer.

CONTROL 1

Polyether polyester thermoplasic elastomer A (see Table I) pellets were fed into the film blowing apparatus. The temperature settings for the extruder unit were: 150°C. rear, 210°–220°C. center and front, 205°–210°C. die. When the molten polymer blend exited from the die, it flowed sideways and folded backward.

Although the molten extrudate was very fluid it could be led manually to the up-take rollers. Attempts to blow up the extruded tube into an inflated cylinder were difficult and generally failed due to the folding back of the extrudate which caused leakage of the bubble. With extreme care films of less than 5 mil thick could be obtained at a blow up ratio of less than 1. Attempts to increase the blow up ratio resulted in the formation of 1 to 2 mil films. The melt tension of the thermoplastic elastomer A was <0.1 gm.

Table I lists the various copolyesters used in the examples.

TABLE I

The copolyester thermoplastic elastomers may be prepared by the procedures described in U.S. Pat. Nos. 3,651,014, 3,766,146, and 3,763,109 all to W. K. Witsiepe. The polymers have the following compositions and melt index as measured by tentative ASTM method D-1238-52T.

The thermoplastic elastomers also contain ~1 weight percent antioxidant and catalyst residues.

TABLE I

| Thermoplastic Elastomer | Phthaloyl (Wt. %) | | | Wt. % PTMEG[a] -1000 | Wt. % 1,4- Butanediol | Melt Index | |
|---|---|---|---|---|---|---|---|
| | Tere | Iso | Ortho | | | 200°C. | 220°C. |
| A | 44.7 | — | 4.4 | 19.4 | 31.0 | — | 7.2 |
| B | 40.2 | — | — | 35.1 | 23.6 | — | 7.6 |
| C | 44.7 | — | 4.4 | 19.4 | 31.0 | — | 4.2 |

TABLE I-continued

| Thermoplastic Elastomer | Phthaloyl (Wt. %) | | | Wt. % PTMEG[a] -1000 | Wt. % 1,4- Butanediol | Melt Index | |
|---|---|---|---|---|---|---|---|
| | Tere | Iso | Ortho | | | 200°C | 220°C |
| D | 27.2 | 7.9 | — | 44.5 | 19.4 | 6.3 | — |

[a]Polytetramethylene ether glycol ing Table. The blends had the melt tension shown in the Table.

| Example | Acid Copolymer | Parts | Polycarbodiimide, parts | Melt Tension | Melt*** Index |
|---|---|---|---|---|---|
| 3 | 16 wt.% isobutylacrylate/6% methacrylic acid/ 78% ethylene | 5 | 4* | 1.5 | 35 |
| 4 | 84% ethylene/16% methyacrylic acid | 8 | 4 | 0.65 | 60 |
| 5 | 84% ethylene/16% | 4 | 2 | 0.6 gm. | — |

*As a 20% concentrate in copolyester C.
**The same polymer as 4, except that 5% of the acid was neutralized by NaOH.
***Melt Index of the acid copolymer.

EXAMPLE 1

Control 1 was repeated except that a mixture of 5 parts of a 4 wt. percent ethyl hydrogen maleate/54% methyl acrylate/42% ethylene copolymer having a Melt Index of ~3.5 and 10 parts of the mixture of copolyester C containing 20% of a mixture of hindered aromatic polycarbodiimides having an average molecular weight of about 1000 was used. The polycarbodiimide contains units of the following structure:

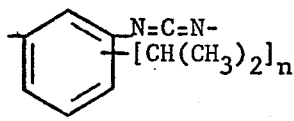

wherein $n$ has an average value of about 3 and is sold as "Stabaxol" PCD by Naftone, Inc., New York, N.Y. The melt tension of the mixture was 0.4 gm. Blown films more than 10 mils thick and with a blow up ratio of greater than 2 were readily produced from this blend.

EXAMPLE 2

The blend was made by mixing in a Farrel 2 cm. (Farrel Co., Ansonia, Conn.) twin screw continuous mixer extruder at ~475°C. for a total cycle time of about 50 sec. (5–10 sec. in the mixer and 30–40 sec. in the extruder) the following four ingredients:

| | Parts | M. I. |
|---|---|---|
| 1. Copolyester A | 100 | |
| 2. A copolymer of 78 wt.% ethylene 16% methyl acrylate, 6% methacrylic acid | 7.5 | 35 |
| 3. 20% polycarbodiimide in copolyester C | 15 | |
| 4. 40% SAF black in Copolyester D | 10 | |

The blend had a melt tension of 0.6 gm. Blown film of more than 10 mil thick with a blow up ratio of more than 2 was produced from this blend.

EXAMPLES 3–5

Blends were made using 100 parts by weight copolyester A and the other ingredients shown in the follow-

I claim:
1. A blend containing 80 to 99.8% by weight of a copolyester consisting essentially of recurring intralinear long chain ester units and short chain ester units randomly joined head-to-tail through ester linkages, the long chain ester units being represented by the formula

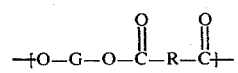

and the short chain ester units being represented by the formula

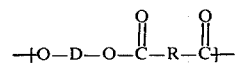

where G is a divalent radical remaining after the removal of terminal hydroxyl groups from at least one long chain glycol having a molecular weight of about 400–6000; R is a divalent radical remaining after removal of carboxyl groups from at least one dicarboxylic acid having a molecular weight less than about 300; and D is a divalent radical remaining after removal of hydroxyl group from at least one low molecular weight diol having a molecular weight of less than 250, said short chain ester units being present in the polyester to the extent of between about 15 and 95% by weight of the polyester, and 0.2 to 20% by weight of a copolymer containing ethylene units and carboxylic acid containing units, said copolymer containing between about 25 and 98.5% by weight ethylene units, and about 1.5 and 30% by weight carboxylic acid containing units, said carboxylic acid units being from 0 to 10% neutralized with metallic ions, said blend also containing at least one substantially linear polycarbodiimide, said blend having a melt tension of at least 0.4 gm.

2. The blend of claim 1 in which the ethylene copolymer also contains polymerized methyl acrylate units.

3. The blend of claim 2 in which the methyl acrylate units are present to the extent of about 50–60 weight percent of the ethylene copolymer.

4. The blend of claim 1 in which the ethylene copolymer contains 2 to 16% by weight carboxylic acid containing units.

5. The blend of claim 4 in which the carboxylic acid containing units are ethyl hydrogen maleate.

6. The blend ofl claim 1 in which the short chain ester units of the copolyester component amount to about 23 to 85% by weight of the copolyester.

7. The blend of claim 1 in which the polycarbodiimide has the formula $X_1—R_1\!\!\leftarrow\!\!N=C=N—R_2\!\!\rightarrow_{\!n}\!\!N=C=N—R_3—X_2$ where $R_1$, $R_2$ and $R_3$ are $C_1$–$C_{12}$ aliphaic, $C_6$–$C_{15}$ cycloaliphatic, or $C_6$–$C_{15}$ aromatic divalent hydrocarbon radicals and combinations thereof, $X_1$ and $X_2$ are

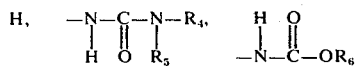

where $R_4$, $R_5$ and $R_6$ are $C_1$–$C_{12}$ aliphatic, $C_5$–$C_{15}$ cycloaliphatic and $C_6$–$C_{15}$ aromatic monovalent hydrocarbon radicals and combinations thereof and additionally $R_4$ and $R_5$ can be hydrogen, and $n$ is at least 2.

8. The blend of claim 7 in which the polycarbodiimide is present in the amount of about 0.2 to 30 percent by weight of the copolyester.

9. The blend of claim 1 in which the copolyester has an inherent viscosity at a concentration of 0.1 gm./dl in meta cresol at 30°C. of between about 0.75 and 1.7.

10. The blend of claim 9 in which the ethylene containing copolymer contains polymerized methyl acrylate units and the carboxylic acid containing polymerized units are ethyl hydrogen maleate.

11. The blend of claim 9 in which a portion of the acid groups on the ethylene copolymer are neutralized with alkali metal ions, alkaline earth metal ions, or zince ions.

12. The blend of claim 9 in which the ethylene containing copolymer contains isobutyl acrylate and methacrylic acid.

* * * * *